United States Patent [19]
Scheuring

[11] Patent Number: 5,879,602
[45] Date of Patent: Mar. 9, 1999

[54] APPARATUS AND METHOD FOR IMPREGNATING FIBROUS STRANDS WITH PLASTIC MATERIAL

[75] Inventor: Bernhard Scheuring, Affalterbach, Germany

[73] Assignee: Werner & Pfleiderer GmbH, Stuttgart, Germany

[21] Appl. No.: 669,710

[22] Filed: Jun. 24, 1996

[30] Foreign Application Priority Data

Jun. 28, 1995 [DE] Germany .......................... 195 23 490.1

[51] Int. Cl.⁶ .............................. B29C 31/08; B29C 67/00
[52] U.S. Cl. .......................... 264/136; 118/124; 118/125; 118/420; 425/114; 425/204
[58] Field of Search .................................... 264/143, 141, 264/136, 171.13; 156/244.12, 244.13, 180; 425/114, 204, 208; 118/420, 124, 125

[56] References Cited

U.S. PATENT DOCUMENTS

| | | | |
|---|---|---|---|
| 2,751,320 | 6/1956 | Jacobs et al. | 156/180 |
| 3,697,209 | 10/1972 | Schlesser | 425/114 |
| 4,484,966 | 11/1984 | Kawamoto | 156/244.12 |
| 4,699,579 | 10/1987 | Bourdon et al. . | |
| 5,084,221 | 1/1992 | Matsuno et al. | 156/244.12 |
| 5,096,645 | 3/1992 | Fink | 156/244.12 |
| 5,110,275 | 5/1992 | Scheuring | 425/114 |
| 5,114,633 | 5/1992 | Stewart | 156/180 |
| 5,120,380 | 6/1992 | Strachan | 425/114 |
| 5,268,050 | 12/1993 | Azari | 156/180 |
| 5,277,566 | 1/1994 | Augistin et al. | 264/136 |
| 5,393,536 | 2/1995 | Brandt et al. | 156/244.12 |
| 5,529,652 | 6/1996 | Asai et al. | 156/180 |
| 5,540,797 | 7/1996 | Wilson | 156/180 |

FOREIGN PATENT DOCUMENTS

| | | |
|---|---|---|
| 0300321 | 1/1989 | European Pat. Off. . |
| 1945675 | 5/1970 | Germany . |
| 2737357 | 2/1978 | Germany . |
| 3717321 | 12/1988 | Germany . |
| 38 24 181 | 2/1989 | Germany . |
| 3835574 | 4/1990 | Germany . |
| 4016784 | 1/1993 | Germany . |
| 57-90020 | 6/1982 | Japan ...................................... 264/141 |
| 89/01863 | 3/1989 | WIPO . |

OTHER PUBLICATIONS

H.-J. Wolf: "Grosse Scherkraefte". In: Maschinenmarkt, Wuerzhburg, Germany, 100, 1994, pp. 28–31.

*Primary Examiner*—Jan H. Silbaugh
*Assistant Examiner*—Mark Eashoo
*Attorney, Agent, or Firm*—Venable; George H. Spencer; Ashley J. Wells

[57] ABSTRACT

An apparatus for impregnating fibrous strands with plastic material as matrix material including: an impregnating core having an outer limiting surface; an impregnating shell defining a cavity therein having an inner limiting surface, the impregnating shell completely enveloping the impregnating core and being disposed with respect to the impregnating core such that the limiting surfaces together define an impregnating channel therebetween, the limiting surfaces concentrically enclosing the impregnating channel along a joint symmetry axis such that the impregnating channel has a ring-shaped cross section in a plane transverse to the joint symmetry axis, the ring-shaped cross section having an outside dimension which diminishes by stages in a flow direction for the impregnation, feeding channels for the fibrous strands and the matrix material being defined at an intake side of the impregnating channel and a discharge opening for impregnated fibrous strands being defined at an exit side of the impregnating channel; and a plurality of expanding elements disposed on the limiting surfaces along the impregnating channel in the flow direction for the impregnation. A method for producing long fiber reinforced plastic materials or unidirectionally fiber reinforced profiles involves the use of the above apparatus in conjunction with an extruder or a pultrusion plant, respectively.

22 Claims, 7 Drawing Sheets

Section A-A

APPARATUS AND METHOD FOR IMPREGNATING FIBROUS STRANDS WITH PLASTIC MATERIAL

FIELD OF THE INVENTION

The invention concerns an apparatus for impregnating fibrous strands with plastic material as the matrix material, particularly glass, carbon, aramid, flax or polymeric fibers with a melting or decomposition point above that of the matrix material used for impregnating. The apparatus comprises an impregnating channel, formed between limiting surfaces, and spreader elements that follow at intervals on both sides of the limiting surfaces in a conveying direction, feed channels being arranged on the intake side for the fibrous strands and the matrix material, a discharge opening being provided for the impregnated fibrous strands.

The invention relates furthermore to a method for producing long-fiber reinforced plastic materials by using the above impregnating apparatus.

BACKGROUND OF THE INVENTION

With such an impregnating apparatus on an extruder for feeding in a fibrous strand, known from DE 40 16 784 A1, the feeding in of the strand as well as the discharge of the strand following the impregnating occurs on a level plane, with little adaptability as to the requirements of the strand wetting. With another apparatus, known from DE 38 35 574 A1, continuously unidirectionally fiber-reinforced linear profiles can be produced. The extrusion-impregnating apparatus here consists of a level, divided housing. Excess material and glass fiber pieces, which have developed from broken fibers during impregnation, must be discharged via an overflow. The fiber content and the cross-sectional geometry of the linear profiles are adjusted via the discharge nozzle. The area of application for this apparatus is strongly limited because of the special features thereof. From EP 0 300 321 B1, it is known that fibrous bundles are pulled through a plastics chamber. The plastics chamber is fed from the side by an extruder with thermoplastic plastics melt. Rotary devices are installed in the plastics chamber for impregnating the fibrous bundles with molten thermoplastic plastic material and to apply a tension to the fiber bundle. However, said rotary devices permit only a limited adaptation to the requirements for impregnating the fibrous strands.

Further serious disadvantages result from the level arrangement of the above-described known designs. Thus, no satisfactory fiber strand guidance is possible, for example, for a central strand discharge that is desired for many applications, in which case the many individual fibrous strands must be combined to form a single strand or a strand profile. Another disadvantage of the known designs is the irregular flow of the melt in the impregnating nozzle, caused by edge influences or an asymmetric run of the fibrous strands. Furthermore, an application over a wide range is countered by the relatively expensive production engineering and the limited options for application. Last but not least, a compact design is no longer possible with the frequently required large number of individual fibrous strands.

SUMMARY OF THE INVENTION

It is the object of the invention to create an apparatus for impregnating fibrous strands which permits an optimum guidance and wetting of the fibrous strands. A method for the operation of the above apparatus is designed to improve the quality of long-fiber reinforced plastic materials.

The solution according to the invention is that the limiting surfaces concentrically enclose the impregnating channel about a joint symmetrical axis by forming a ring-shaped gap, wherein the inner limiting surface is formed by an impregnating core and the outer limiting surface by an impregnating shell and the impregnating shell completely surrounds the impregnating core. Thus, the apparatus essentially consists of an impregnating shell and an impregnating core with a joint symmetrical axis and permits a completely symmetrical arrangement of the fibrous strands in the plastic material flow direction. An axially expanding ring-shaped gap develops between the impregnating shell and the impregnating core. With this, a plurality of application options for the apparatus for producing molded plastic parts or profiles can be realized. Further advantages or particular effects result from the very even flow of the plastic material over the circumference of the impregnating channel and a change in the relative speed between fibrous strand and plastic material, based on a tapering off of the impregnating channel cross-section in the conveying direction. In another embodiment of the invention, the impregnating head, which is composed of individual modules, permits a longitudinal adaptation of the fiber guidance. Impregnating core and impregnating shell are equipped with a heater to optimize the plastics' melt viscosity, so that the total impregnating head can be controlled to remain at the required temperature. Stages in the ring-shaped gap and the spreader rings arranged here cause an opening of the fibrous strand in the impregnating channel. The spreader rings can either be incorporated directly into the impregnating shell and the impregnating core, or can be inserted as replaceable molded parts. Because the spreader rings are in direct contact with the fibrous strand, these must be made from a particularly wear-resistant material.

The axial position of the impregnating core can be adjusted relative to the impregnating shell position. This can, for example, be done with spacer rings of various heights between the impregnating shell and the flange of the impregnating core. The angle of contact or the redirecting of the fibrous strands around the spreader rings is changed through an axial change in the relative position. This is used to adjust the degree of expansion and the take-off tension of the fibrous strands. For the operating condition, the impregnating core is attached to and sealed at the impregnating shell by means of a quick acting closure or screws.

A replaceable molded part is built-in at the end of the impregnating core. The gap width at the end of the impregnating head and thus also the pressure in the impregnating channel can be adjusted with the above molded part. In case the individual fibrous strands are to be discharged separately, a respectively designed molded part can be inserted as a calibration nozzle.

The impregnating core has intake openings, distributed along circumference of the front of the intake side to feed the fibrous strands into the impregnating head. These intake openings can be worked either directly into the front of the impregnating core, or can also be inserted as individual feed nozzles into this front region. Because this region is particularly subject to wear and tear, it must be made from correspondingly wear-resistant material. With a respective length and relatively small gap width for the intake opening, the drag flow of the incoming fibers will prevent melt from leaving the impregnating head. The intake openings have a cone-shaped feed to prevent fanning out of the fibrous strands during the feeding into the impregnating head.

In a special embodiment, the feed nozzles can also have slits on the side. In connection with slits extending radially to the outside in the area of the flange for the impregnating core, strands that have not yet been threaded can be joined to an already fed-in strand and can be reapportioned during the still running process to go to the respectively provided feed nozzle. To do this, the impregnating core must be raised slightly the axial direction. The existing slits can be closed off with a filler piece during normal operating conditions.

The matrix material for impregnating the fibrous strands is preferably introduced from the side through the impregnating shell into the ring-shaped gap of the impregnating channel. In that way, the impregnating core can be lifted freely from the impregnating shell or inserted into it. Thermoplastic matrix material as a rule is fed into the impregnating channel by means of an extruder. Thermoset matrix materials, for example, can also be fed via a pump into the impregnating head. Depending on the requirements or the use of the impregnating head, the matrix material can be fed into the ring-shaped gap either directly via a borehole, or for a more even distribution of the matrix material over the circumference of the impregnating channel, similar to the coextrusion, via modified spiral mandrel distributors or side-fed dies. A feeding of the melt directly at a spreader ring into the ring-shaped gap can also be of advantage with respect to the quality of the impregnation.

The use of the above-described impregnating head is now described in the following.

All applications have in common that prior to further processing, the fibrous strands are pulled through the impregnating head according to the invention, and are impregnated there with matrix material. In doing so, several fibrous strands, which are pulled from a spool or drum, are as a rule guided over a pre-heating segment and threaded into feed nozzles, which are inserted into the impregnating core. In addition to fixing the position of the fibrous strands, the feed nozzles take on a sealing function and ensure a gentle feeding of the fibrous strands through a conical intake profile. The impregnating core is pulled out of the impregnating shell for a simple threading and pulling of the fibrous strands through the impregnating head. The threaded fibrous strands can then be bundled or sent individually through the open impregnating shell from the intake side to the discharge side. Subsequently, the impregnating core is inserted once more into the impregnating shell. By inserting the impregnating core into the impregnating shell, the fibrous strands are pushed by the spreader rings of the impregnating core against the spreader rings of the impregnating shell. This will fan out the fibrous strands that are fed in with a preliminary tension. The relative axial position of corresponding spreader rings with respect to each other, is adjusted with the aid of a respectively dimensioned spacer ring between impregnating shell and impregnating core, such that the fibrous strands are deflected to the desired degree from the straightline path. The wetting of the fibrous strands can additionally be affected by the number of corresponding spreader rings used and their outside profiles. After the impregnating core has been attached to the impregnating shell with respective fastening means, the impregnating head can be put into operation once the matrix material is added. The volume of the matrix material can be kept low through a suitable dimensioning of the ring-shaped gap for the impregnating channel. The required amount of matrix material is regulated via a flow control device of the feed-in extruder or a feed-in pump. The pressure inside the impregnating head can be adjusted independent of the flow through a corresponding selection of a replaceable reduction element, installed at the end of the impregnating core. The take-off of the fibrous strands from the impregnating head depends on the application method used and is described below with the aid of various examples.

EXAMPLE 1

For the production of long-fiber reinforced plastic materials, the impregnating head is linked to a single or double screw extruder, with which the fibrous strands that are pre-impregnated in the impregnating head are fed into the extruder directly from the extruder conveying screws or through auxiliary means. As a rule, the impregnating head is flanged on between the melting section and the mix-in section of the extruder. For this purpose, the extruder has a respective opening in the housing. Owing to the fact that the fibrous strands are already impregnated with the viscous plastics matrix before they are pulled into the screw conveyor, the fibrous strands can be mixed very gently into the plastics matrix as compared to a conventional mode of operation. In the final product, this results in a clearly longer resulting fiber length. The long-fiber reinforced plastic material, which is processed in the extruder, can either be molded directly to form a final product, or to form a long-fiber reinforced intermediate product. Optional methods are, for example, the direct extrusion method for long-fiber reinforced profiles, the direct processing of long-fiber reinforced plastic materials in the compression molding method, or, for example, the direct feeding of a blow molding plant with fiber-reinforced plastic materials. The long-fiber reinforced intermediate products, for example, can be granules or plates or bands, which are processed further in another process to form the final product. One very essential advantage here is the fact that rubbed-off fibers and broken individual filaments, which develop during the impregnating, are washed through the relatively large intake opening directly into the extruder without clogging the impregnating head, so that the continuous impregnating process is not disrupted. The the modular design of impregnating head makes it possible to take into account the plastics matrix used, for example by replacing spreader rings with others that have somewhat modified profiles and by replacing the spacer ring.

EXAMPLE 2

For the production of unidirectionally fiber-reinforced profiles, the fibrous strands are pulled continuously through the impregnating head and are put into the respective shape by a nozzle at the discharge for the impregnating head. This process is generally referred to as a pultrusion process. One variation of the impregnating head makes it possible to apply additional coextruded core and shell layers of unreinforced or fiber-reinforced plastics. The coextrusion dies necessary for the above are directly integrated into the impregnating head. Furthermore, it is possible to pull an additional material, which is to be surrounded by fibrous strands, through the impregnating core center in place of the core layer. So-called sandwich profiles can be produced in this way.

EXAMPLE 3

Best known in the area of long fiber reinforced thermoplastics is the production of granules from fiber-reinforced thermoplastic material, wherein a plurality of individual filaments of the reinforcement fiber are arranged parallel in a matrix of thermoplastic material and the fiber length is the same as the granule length. In this case, the impregnating head according to the invention can also be used to impregnate the reinforcement fibers with the thermoplastic material. For this, a respectively shaped molded element is inserted as a calibration nozzle at the end of the impregnating core. The individual fibrous strands wetted with melt are pulled off continuously from a take-off unit after passing through a cooling segment and are fed to granulation.

EXAMPLE 4

In this case, the reinforcement fibers wetted with the plastics matrix are deposited directly on a rotating mandrel. The rotating mandrel in this case pulls the fibrous strands through the impregnating head according to the invention. The flow speed for the fibrous strands can be controlled via the rotational speed of the mandrel. The plastics matrix can be thermoset as well as the thermoplastic plastic material.

BRIEF DESCRIPTION OF THE DRAWINGS

In the following, the invention is explained in detail with the aid of several exemplary embodiments, which are shown as diagrams in the drawing. Shown are FIG. 1 A longitudinal sectional view through the impregnating head, wherein this head is flanged to an extruder housing.

DETAILED DESCRIPTION OF THE INVENTION

Figure 1:
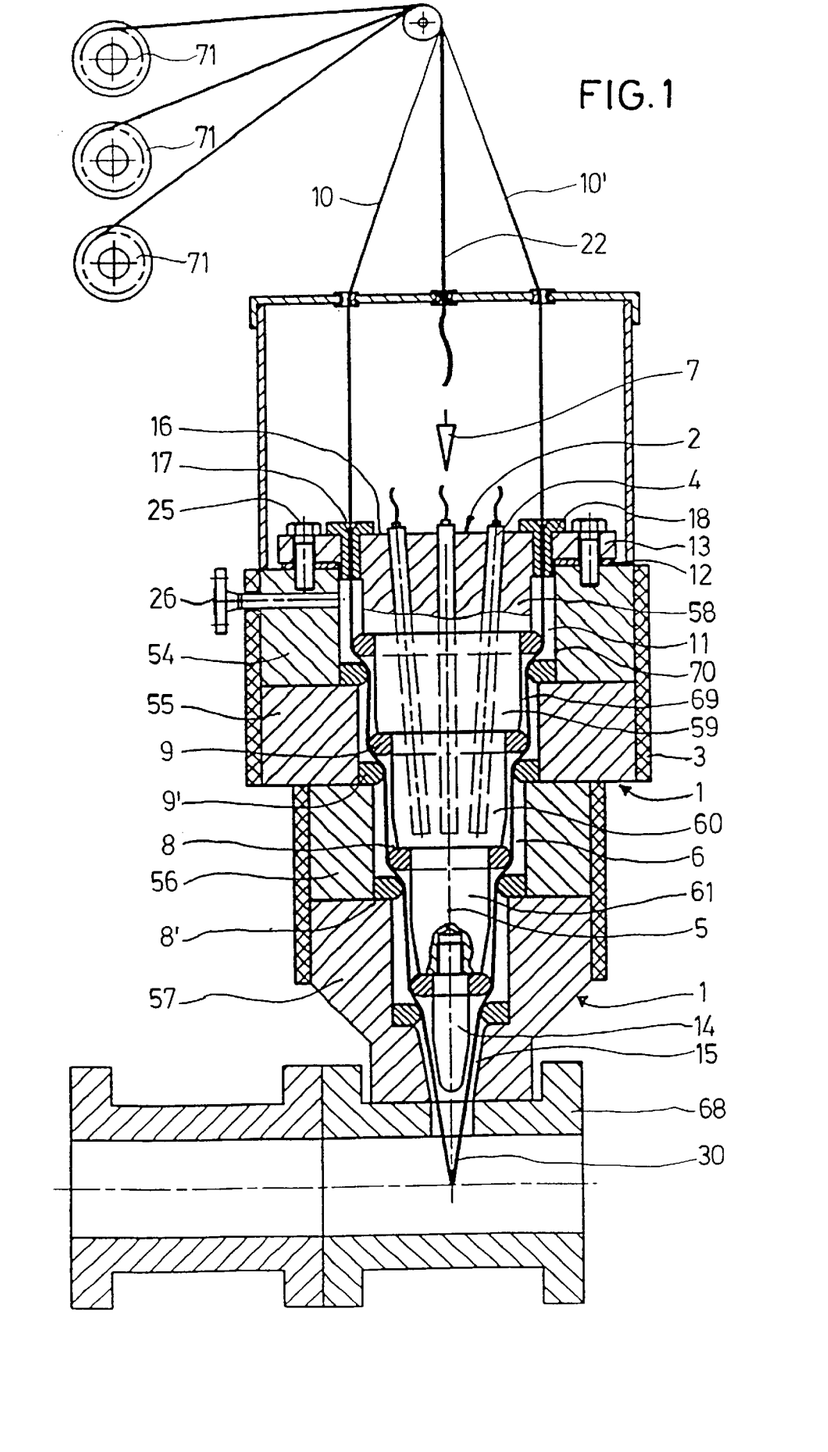

FIG. 1 displays the impregnating head, which essentially consists of the impregnating shell 1 and the impregnating core 2 and is flanged onto an extruder housing 68. A heating device is provided for impregnating shell 1 and impregnating core 2. The impregnating shell 1 is heated by an electric heating jacket 3 and the impregnating core 2 by electric heating cartridges 4. The impregnating shell 1 and the impregnating core 2 have a joint symmetrical axis 5, wherein the impregnating shell 1 completely surrounds the impregnating core 2. The outside dimensions of a ring-shaped gap 6 between impregnating shell 1 and impregnating core 2 are diminished in flow direction 7 by stages. Respectively shaped spreader rings 9, 9' are located at all stages 8, 8' of impregnating core 2 and impregnating shell 1. These spreader rings cause the fibrous strand 10, 10' to open up inside impregnating channel 11.

The spreader rings 9, 9' can either be incorporated directly into the impregnating shell 1 and the impregnating core 2, or can be inserted as replaceable molded parts. Since the spreader rings 9, 9' are in direct contact with fibrous strand 10, 10', these must be produced from a particularly wear-resistant material.

The impregnating shell 1 and the impregnating core 2, on the other hand, can be composed of several individual parts 54, 55, 56, 57 or 58, 59, 60, 61 in a modular design. On the one hand, this permits an installation of spreader rings 9, 9' without dead space and, on the other hand, permits a stage-by-stage adaptation to the desired size or the number of required fibrous strands.

The axial position of the impregnating core 2 can be adjusted relative to the position of impregnating shell 1. This can be achieved by means of spacer rings 12 of varying heights between the impregnating shell 1 and the flange 13 or the impregnating core 2. For a relative axial displacement of impregnating core 2 and impregnating shell 1, the angle of arc or the redirecting of the fibrous strands 10, 10' around spreader rings 9, 9' is changed. The degree of spreading and the take-off tension for the fibrous strands 10, 10' can be adjusted as in this way.

Figure 3:
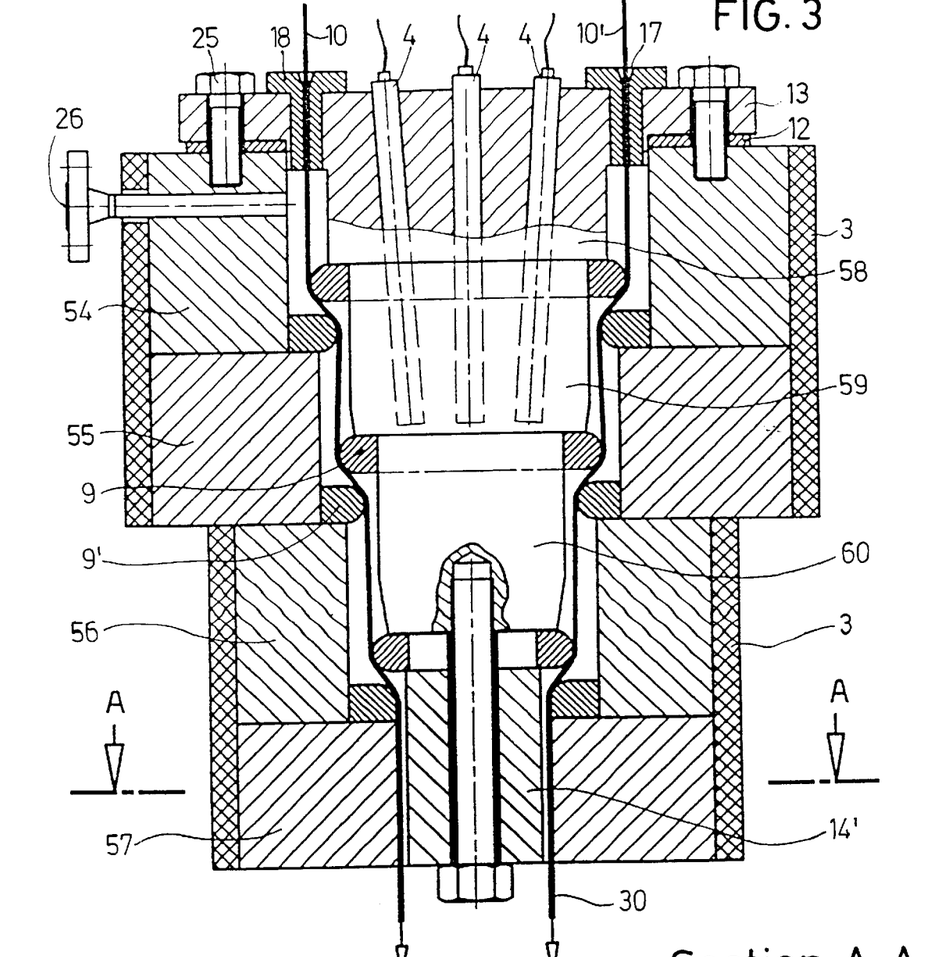
FIG. 3 A longitudinal and cross-sectional view of the impregnating head with a built-in calibration nozzle.

A replaceable molded part 14 is built in at the end of impregnating core 2. This molded part is used to adjust the gap width 15 between impregnating core 2 and impregnating shell 1 at the end of the impregnating head and thus the pressure in the impregnating channel. For the case that the plurality of fibrous strands 10, 10' are not to be discharged as a bundle, but individually, a respectively shaped molded part 14 can be inserted as calibration nozzle 14', in accordance with FIG. 3.

The fibrous strands inserted for reinforcement correspond to pulled off spools 71. The impregnating core 2 has intake openings 17, distributed along the circumference at the intake side front 16, for feeding the fibrous strands 10, 10' into the impregnating head. The intake openings 17 can be incorporated directly into front 16 of impregnating core 2, or can also be inserted as individual feed nozzles 18 into front 16 of the impregnating core 2. Since the intake opening 17 is especially subjected to wear and tear, it must be manufactured from a correspondingly wear-resistant material. If the intake opening has a sufficiently dimensioned length and relatively narrow gap width, the drag flow of the incoming fibrous strand 10, 10' prevents melt from leaving on the intake side of the impregnating head. The intake openings 17 have a conical feed-in taper to prevent a fanning out of the fibrous strands 10, 10' while they are pulled into the impregnating head.

Figure 2:
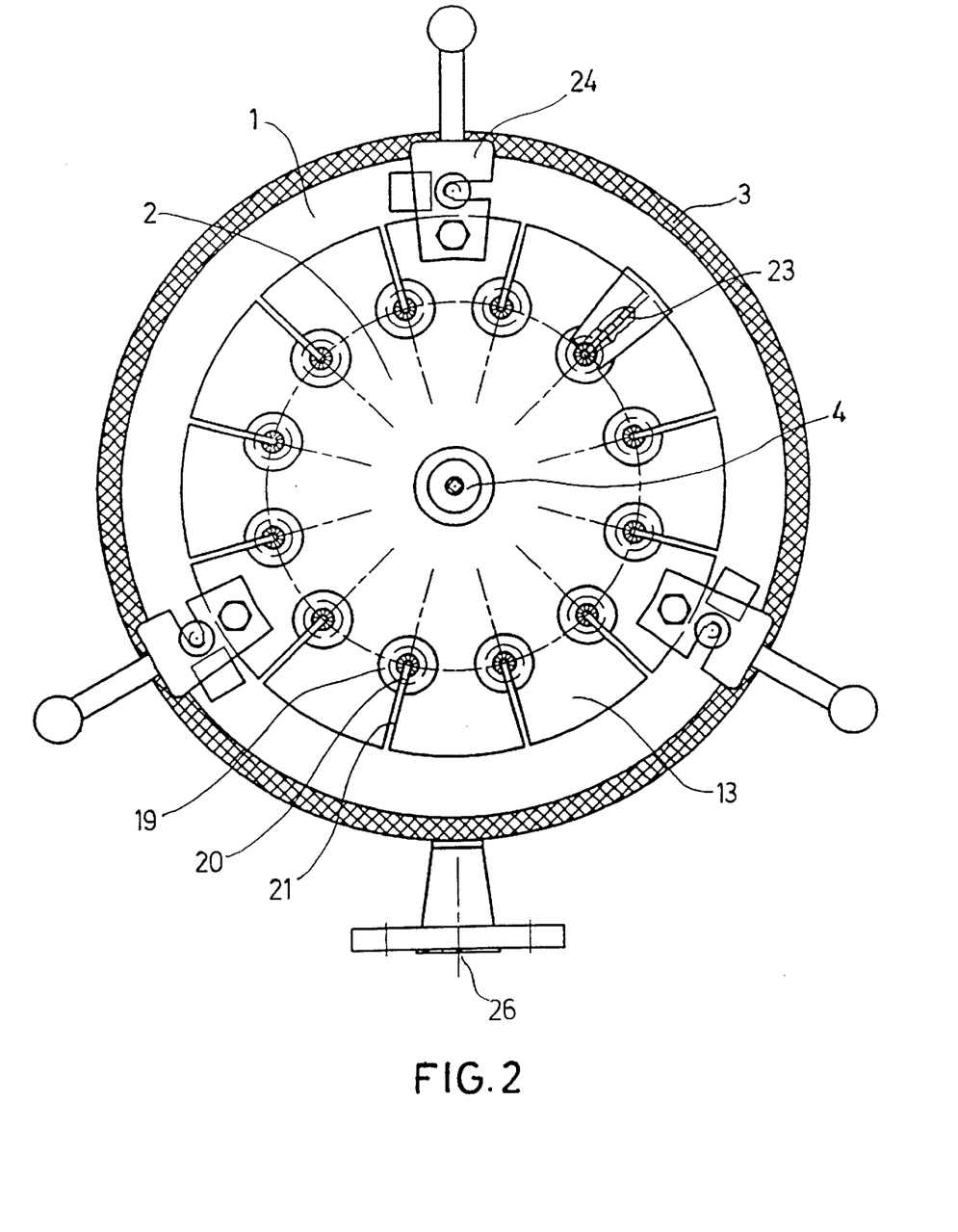
FIG. 2 A top view of the impregnating head, in a slightly modified form.

In a special embodiment, FIG. 2 shows feed nozzles 19 with a slit 20, that extends radially outward. In connection with the radially outward extending slits 21 in the area of flange 13 of impregnating core 2, fibrous strands 22 (see FIG. 1), which have not yet been threaded, can be tied to an already pulled-in fibrous strand 10, 10' and can be reapportioned to the respectively provided feed nozzle while the operation is still running. To do this, the impregnating core 2 must be raised slightly in the axial direction. The existing slits 20, 21 can be closed off with a filler piece 23 during normal operations.

As shown in FIG. 2, the impregnating core 2 can be attached to impregnating shell 1 by means of a quick acting closure 24 (e.g. bayonet catch) or with screws 25, as shown in FIG. 1.

On the intake side, the seal between impregnating shell 1 and impregnating core 2 is created at the frontal surfaces of spacer ring 12.

Figure 4:
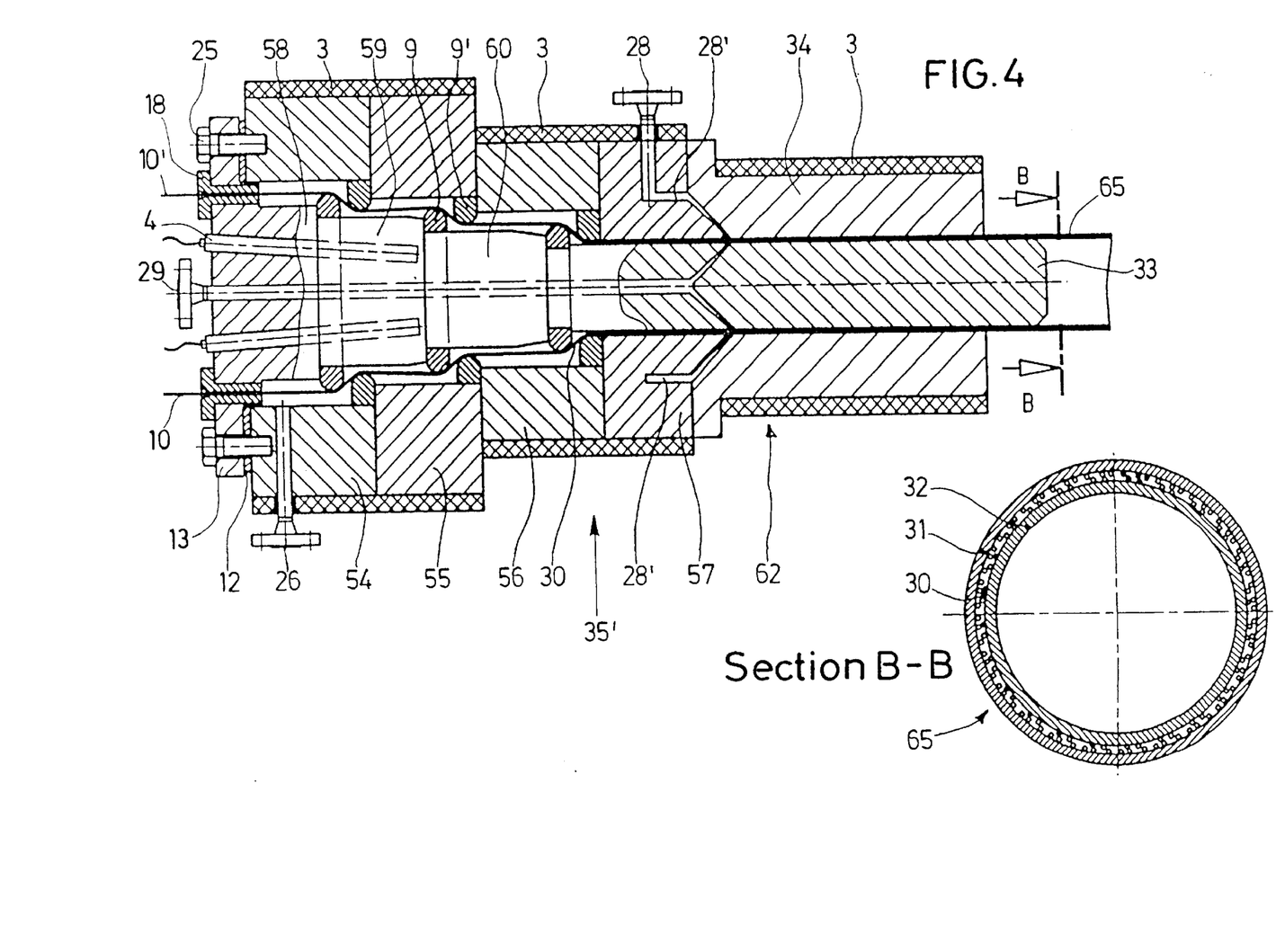
FIG. 4 A sectional view of an through the impregnating head with integrated coextrusion die.
Figure 5:
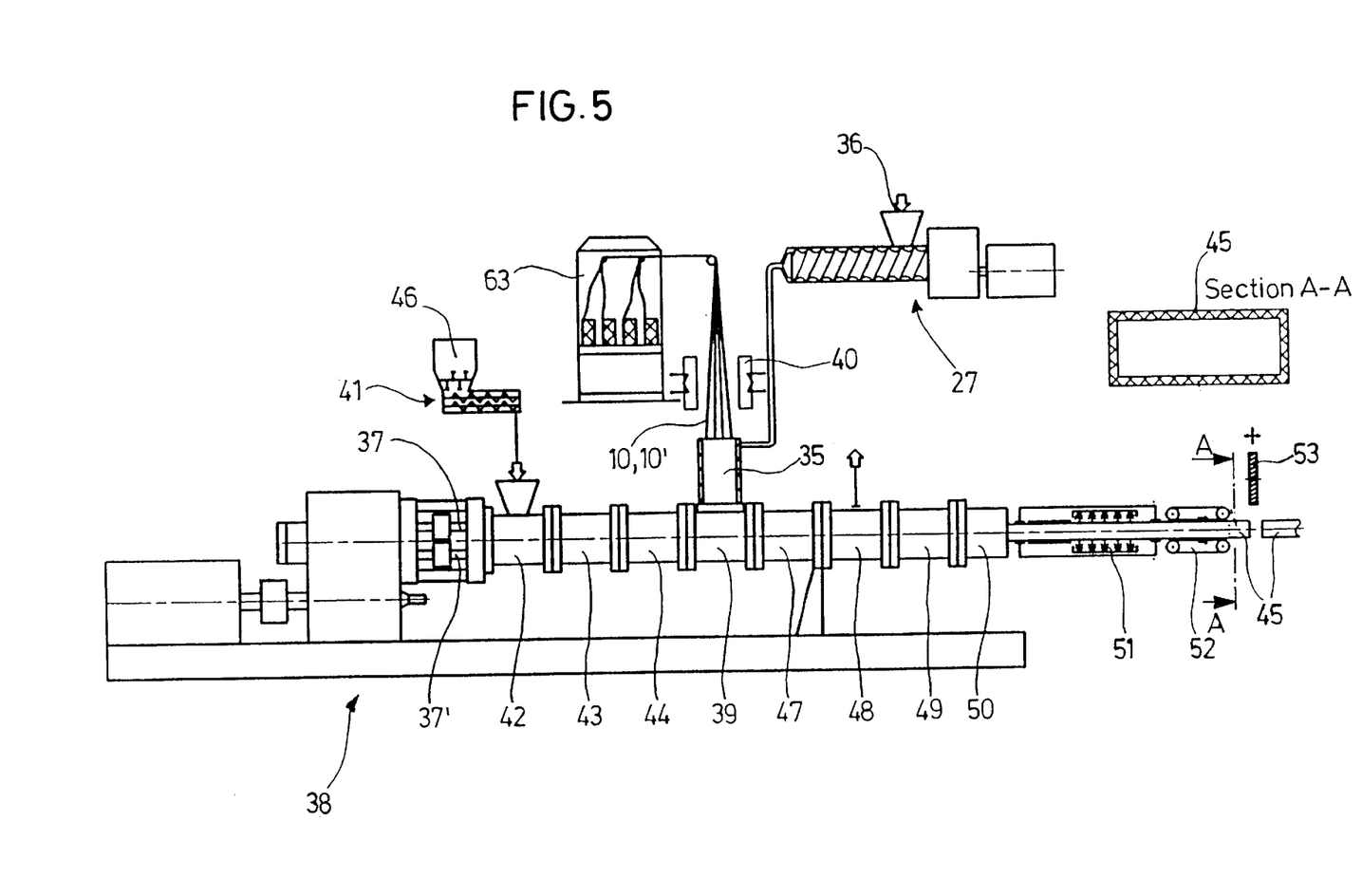
FIG. 5 An extrusion plant for producing long-fiber reinforced profiles with integrated impregnating head.

The matrix material for impregnating the fibrous strands 10, 10' is advantageously added from the side, via the feed channel 26, through the impregnating shell 1 and into the impregnating channel 11. As a rule, this occurs by means of a feeding extruder 27 for thermoplastic matrix material, as shown in FIG. 5. Thermoset matrix materials can, for example, be fed by a pump that is not shown here into the impregnating head. Depending on the requirements or the use of the impregnating head, the plastics matrix material can be fed into the impregnating channel 11 either directly via the feeding channel 26, or via a melt distribution system similar to the coextrusion to ensure an even distribution of the plastics matrix materials over the circumference of the impregnating channel 11. Modified spiral mandrel distributors or side-fed dies can be used, for example, as a melt distribution system. A corresponding melt distribution system 28' is shown in FIG. 4, with the example of a variation of an impregnating head with coextrusion die 62. The feeding of the melt into the impregnating channel 11, directly at a spreader ring 9', can be of advantage with respect to the impregnating quality. Adding the plastic material directly below the feed nozzle 18 or 19 respectively ensures a forced flushing of the total impregnation channel 11. The impregnating head shown in FIG. 4 permits the application of additional plastics layers to the already impregnated fibrous strands 30 in the discharge area. The shell layer 31 around impregnated fibrous strands 30 is applied via the feeding channel 28 and the melt distribution system 28'. The core layer 32 around the impregnated fibrous strands 30 travels via the feeding channel 29 into the discharge area of the impregnating head. The displacer body 33 forms the inside contour of the pultruded profile. The outside contour is formed by nozzle 34.

FIG. 5 shows a plant for producing long-fiber reinforced profiles, wherein fibrous strands 10, 10', which are pre-impregnated by an impregnating head 35 with a plastics matrix 36, are pulled in directly from screws 37, 37' of the compounding extruder 38 in housing 39. The fibrous strands 10, 10' in this case are pulled from a spool support 63. Prior to pulling the fibrous strands 10, 10' into the impregnating head 35, these are preheated by means of a heater 40. The melting open and metering out of the plastics matrix material for the impregnating head 35 occurs in the feeding extruder 27. The polymeric base material 46 for profile 45 that is to be extruded is added via the metering device 41 to the intake housing 42 and into the compounding extruder 38, and is changed to the viscous condition in housing 43 and 44. The fibrous strands 10, 10', which are pre-impregnated with the plastics matrix material 36 and are fed in by the screws 37, 37' of compounding extruder 38, are then brought together in housing 39 with the polymeric base material 46. The use of varied polymeric matrix materials 36 and 46, will take into account the requirement for the lowest possible viscosity for impregnating the fibrous strands 10, 10' as well as the requirement for a sufficient melt stability for the extrusion of profile 45. The separation of fibrous strands 10, 10' and the homogeneous distribution in the polymeric matrix material take place in housing 47, wherein special non-depicted screw elements are used to effectively distribute them. By feeding in already pre-impregnated fibrous strands 10, 10', it is possible to have a very gentle mixing, in contrast to the conventional way of mixing in fibrous strands. The product reinforced with long fibers can then be vented in housing 48 and discharged via housing 49 and the profile die 50. Following the calibration and cooling of the extruded profile 45 through a spray-cooling 51, the profile is pulled off the take-off unit 52 and, according to demand, sawed with a saw 53 to the desired length. The essential advantages here are the production from the first heat, the possible use of cheaper raw polymers and the extrusion of profiles with long-fiber reinforcement inserts with optimum mixing and wetting of the individual filaments of the fibrous inserts through use of the impregnating head according to the invention. This leads to products with optimum mechanical characteristics and good surface quality.

Figure 6:
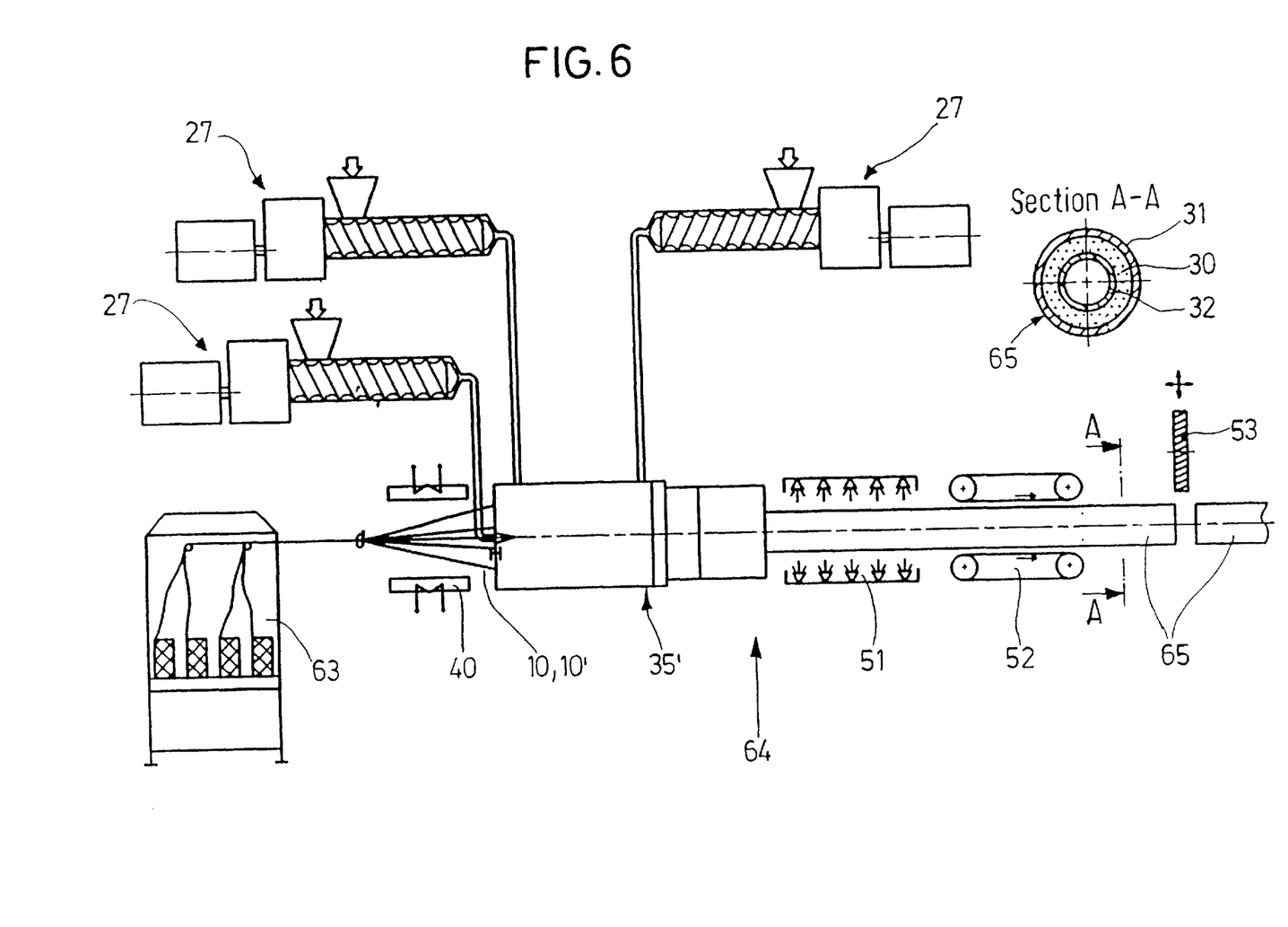
FIG. 6 A schematic view of a pultrusion plant for producing profiles with integrated coextrusion impregnating head.

FIG. 6 shows a pultrusion plant 64 for producing endless fiber-reinforced profiles with use of the impregnating head 35' according to the invention, as it is shown on principle in FIG. 4. In this case, an additional shell layer 31 and a core layer 32 are extruded by means of impregnating head 35' on the discharge side around the impregnated fibrous strands 30. This permits the production of a unidirectionally reinforced pultrusion profile 65 with excellent surface quality.

Figure 7:
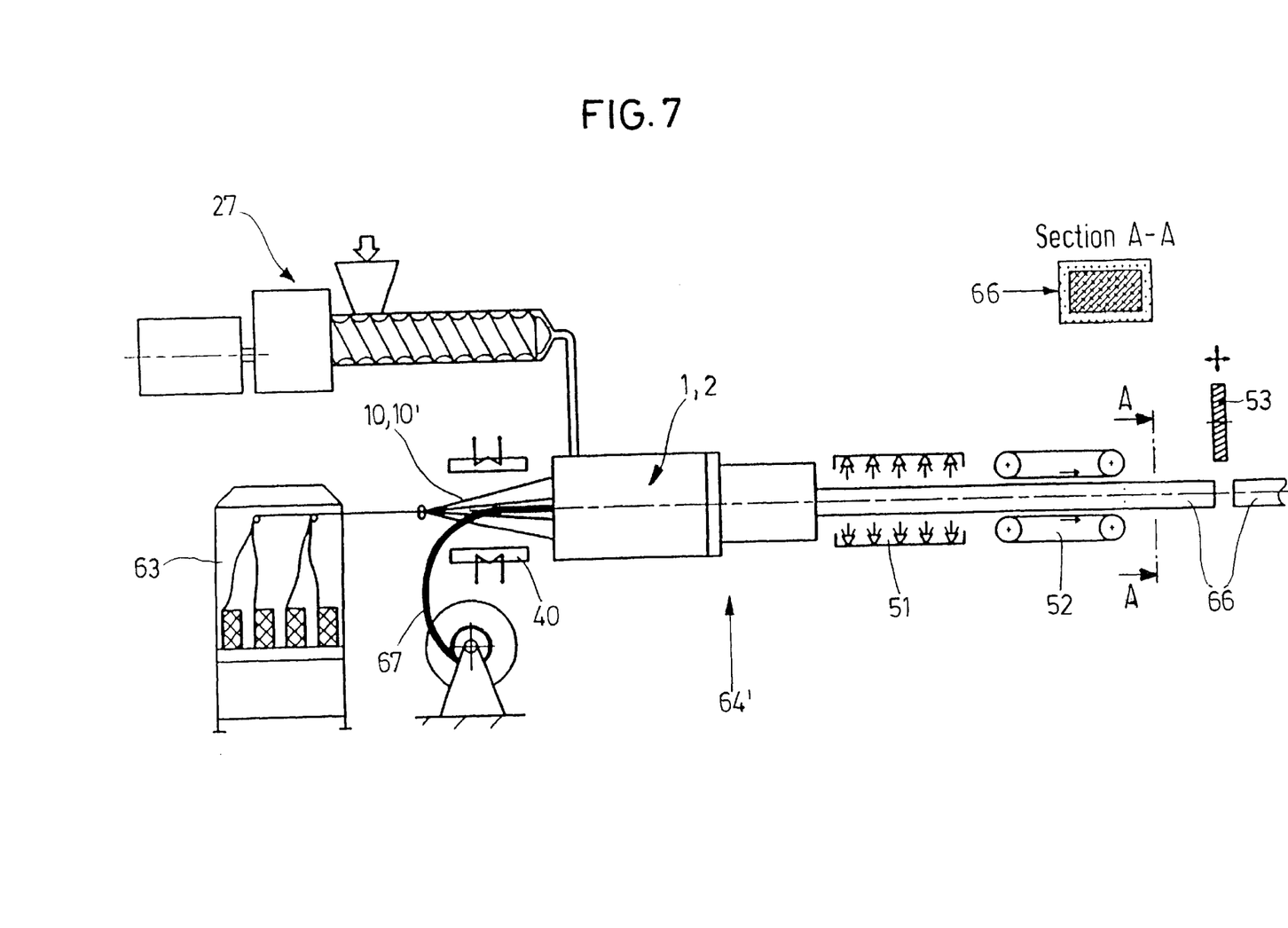
FIG. 7 A schematic view of a pultrusion plant for producing sandwich profiles with integrated impregnating head.

FIG. 7 shows a pultrusion plant 64' for the production of endless fiber-reinforced sandwich profiles 66, with use of the impregnating head according to the invention, which essentially consists of the impregnating shell 1 and the impregnating core 2. In this case, a core profile 67 is also pulled through the impregnating head and surrounded by the impregnated fibrous strands 30.

What is claimed is:

1. An apparatus for impregnating fibrous strands with plastic material as matrix material, the fibrous strands having one of a melting and a decomposition point above that of the matrix material used for impregnation, the apparatus comprising:

an impregnating core having an outer limiting surface;

an impregnating shell defining a cavity therein having an inner limiting surface, the impregnating shell completely enveloping the impregnating core and being disposed with respect to the impregnating core such that the limiting surfaces together define an impregnating channel therebetween, the limiting surfaces concentrically enclosing the impregnating channel along a joint symmetry axis such that the impregnating channel has a ring-shaped cross section in a plane transverse to the joint symmetry axis, the ring-shaped cross section having an outside dimension which diminishes by stages in a flow direction for the impregnation, feeding channels for the fibrous strands and the matrix material being defined at an intake side of the impregnating channel and a discharge opening for impregnated fibrous strands being defined at an exit side of the impregnating channel; and a plurality of expanding elements disposed on the limiting surfaces along the impregnating channel in the flow direction for the impregnation.

2. The apparatus according to claim 1, wherein the impregnating shell and the impregnating core have a modular design and each comprise an optional number of individual modules.

3. The apparatus according to claim 1, further including heating devices disposed on the impregnating shell and on the impregnating core, respectively.

4. The apparatus according to claim 1, wherein the expanding elements comprise spreader rings disposed at the respective stages of the ring shaped cross section of the impregnating channel on respective ones of the impregnating shell and the impregnating core.

5. The apparatus according to claim 4, wherein the spreader rings are incorporated directly into the impregnating shell and the impregnating core.

6. The apparatus according to claim 4, wherein the spreader rings comprise replaceable molded parts inserted into respective ones of the impregnating shell and the impregnating core.

7. The apparatus according to claim 6, wherein the replaceable molded parts are made from wear-resistant ceramic material.

8. The apparatus according to claim 1, further comprising means for adjusting an axial position of the impregnating core with respect to the impregnating shell.

9. The apparatus according to claim 8, wherein:
the impregnating core has a flange; and the means for adjusting comprise spacer rings of varying heights adapted to be disposed between the impregnating shell and the flange of the impregnating core.

10. The apparatus according to claim 1, further comprising replaceable molded parts installed adjacent the discharge opening at an end region of the impregnating core.

11. The apparatus according to claim 10, wherein the molded part and the inner limiting surface of the cavity of the impregnating shell define a calibration nozzle therebetween.

12. The apparatus according to claim 1, wherein the feeding channels define intake openings distributed around a circumference of an intake front side of the impregnating core.

13. The apparatus according to claim 12, wherein the intake openings are defined directly by the intake front side of the impregnating core.

14. The apparatus according to claim 12, further comprising individual replaceable feed nozzles inserted into the intake front side of the impregnating core, the feed nozzles defining the intake openings.

15. The apparatus according to claim 14, wherein the feed nozzles are made of a wear-resistant ceramic.

16. The apparatus according to claim 1, wherein the impregnating shell is configured such that the matrix material is adapted to be added into the impregnating channel through the impregnating shell.

17. The apparatus according to claim 1, further comprising a melt distribution system connected to the impregnating channel for placing the matrix material such that it is evenly distributed about a circumference of the impregnating channel.

18. The apparatus according to claim 1, wherein the expanding elements comprise spreader rings disposed at the respective stages of the ring shaped cross section of the impregnating channel on respective ones of the impregnating shell and the impregnating core, one of the spreader rings being configured such that the matrix material is adapted to be added directly through said one of the spreader rings such that it flows into the impregnating channel.

19. The apparatus according to claim 1, further comprising a displacer body disposed in the cavity of the impregnating shell, the impregnating core defining a core feeding channel therein for coextruding a core layer, the core feeding channel distributing the matrix material evenly around the displacer body.

20. The apparatus according to claim 1, further comprising a melt distribution system connected to the impregnating channel, the apparatus further defining a head feeding channel which runs into the melt distributing system installed at a discharge region of the apparatus for coextruding a shell layer.

21. A method for producing long fiber reinforced plastic materials with the apparatus of claim 1, comprising the steps of:

connecting the apparatus to one of a single screw and a double screw extruder;

feeding preimpregnated fibrous strands from the apparatus into the extruder; and mixing the fibrous strands into a viscous plastic material.

22. A method for producing long fiber reinforced plastic materials with the apparatus of claim 1, comprising the steps of:

connecting the apparatus to one of a single screw and a double screw extruder;

preimpregnating fibrous strands in the apparatus thereby forming preimpregnated fibrous strands;

feeding the preimpregnated fibrous strands from the apparatus into the extruder; and mixing the fibrous strands into a viscous plastic material.

* * * * *